United States Patent
Lee et al.

(10) Patent No.: US 11,210,281 B2
(45) Date of Patent: Dec. 28, 2021

(54) TECHNIQUE FOR LOG RECORDS MANAGEMENT IN DATABASE MANAGEMENT SYSTEM

(71) Applicant: TmaxData Co., Ltd., Gyeonggi-do (KR)

(72) Inventors: Minho Lee, Gyeonggi-do (KR); Hakyong Lee, Gyeonggi-do (KR); Chanho Hwang, Gyeonggi-do (KR); Sang Young Park, Seoul (KR); Tai Kyoung Kim, Gyeonggi-do (KR); Jeongho Na, Gyeonggi-do (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 189 days.

(21) Appl. No.: 16/383,511

(22) Filed: Apr. 12, 2019

(65) Prior Publication Data

US 2020/0293509 A1    Sep. 17, 2020

(30) Foreign Application Priority Data

Mar. 14, 2019    (KR) .................. 10-2019-0029223

(51) Int. Cl.
*G06F 16/23* (2019.01)
*G06F 16/22* (2019.01)
(Continued)

(52) U.S. Cl.
CPC ...... *G06F 16/2358* (2019.01); *G06F 11/1435* (2013.01); *G06F 11/3034* (2013.01); *G06F 16/2272* (2019.01); *G06F 16/278* (2019.01)

(58) Field of Classification Search
CPC ............. G06F 16/2272; G06F 16/2358; G06F 16/278; G06F 11/1435; G06F 11/3034
See application file for complete search history.

(56) References Cited

U.S. PATENT DOCUMENTS

| 5,903,898 A  * | 5/1999 | Cohen ................ G06F 16/1734 707/648 |
| 6,647,510 B1 * | 11/2003 | Ganesh ............... G06F 11/1474 714/16 |

(Continued)

FOREIGN PATENT DOCUMENTS

| JP | H07160563 A | 6/1995 |
| KR | 1020140006945 A | 1/2014 |

(Continued)

OTHER PUBLICATIONS

Korea Intellectual Property Office, Office Action, dated May 19, 2020.

*Primary Examiner* — Irete F Ehichioya
*Assistant Examiner* — Xiaoqin Hu
(74) *Attorney, Agent, or Firm* — Umberg Zipser LLP; Ryan Dean

(57) ABSTRACT

Disclosed is a computer program stored in a computer-readable storage medium including encoded commands according to an exemplary embodiment of the present disclosure. When the computer program is executed by one or more processors, the computer program allows the one or more processors to perform a method for managing undo information in a database management system (DBMS). The method may include: forming undo information corresponding to an update request by a first transaction in response to the update request by the first transaction in the database management system (DBMS); determining an undo memory chunk to be allocated to the undo information from an undo memory pool on a memory, the undo memory chunk having a variable size; and maintaining the undo information on a space of the memory by using the determined undo memory chunk.

20 Claims, 7 Drawing Sheets

(51) Int. Cl.
*G06F 11/14* (2006.01)
*G06F 11/30* (2006.01)
*G06F 16/27* (2019.01)

(56) References Cited

U.S. PATENT DOCUMENTS

| | | |
|---|---|---|
| 6,976,022 B2 | 12/2005 | Vemuri et al. |
| 6,981,004 B2 * | 12/2005 | Ganesh .............. G06F 16/2365 |
| 7,574,419 B2 * | 8/2009 | Krishnaswamy ... G06F 16/2379 |
| 8,650,169 B1 | 2/2014 | Jacobs et al. |
| 9,411,685 B2 | 8/2016 | Lee |
| 9,600,415 B1 | 3/2017 | Lee et al. |
| 9,823,981 B2 | 11/2017 | Kalach et al. |
| 10,146,631 B1 * | 12/2018 | Pradeep .............. G06F 11/1471 |
| 2006/0072400 A1 * | 4/2006 | Anderson ............ G06F 3/0605 |
| | | 369/47.1 |

FOREIGN PATENT DOCUMENTS

| | | |
|---|---|---|
| KR | 1020150061258 A | 6/2015 |
| KR | 101643278 B1 | 7/2016 |

\* cited by examiner

[Fig. 1]
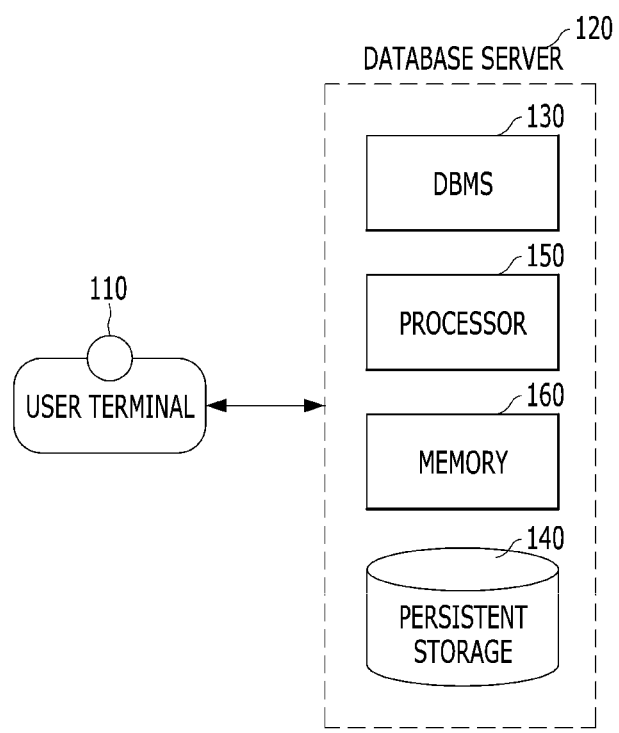

[Fig. 2]
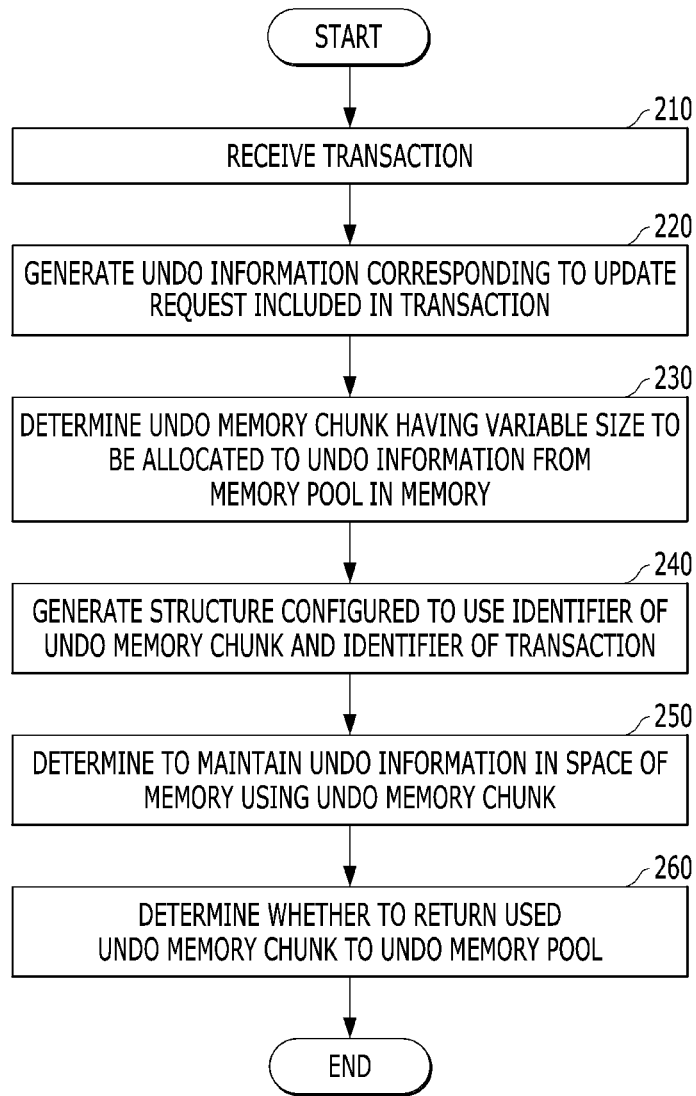

[Fig. 3a]
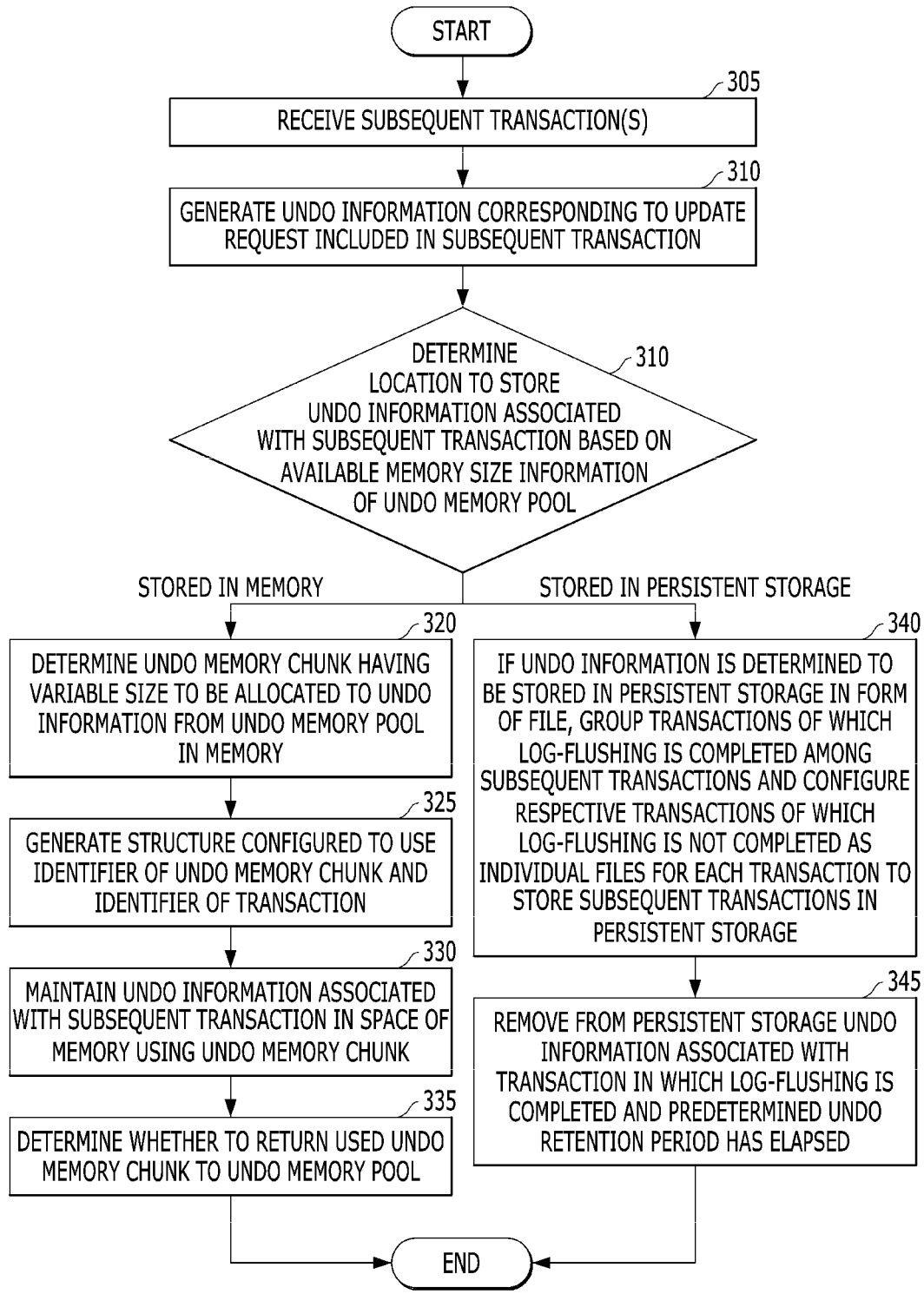

[Fig. 3b]
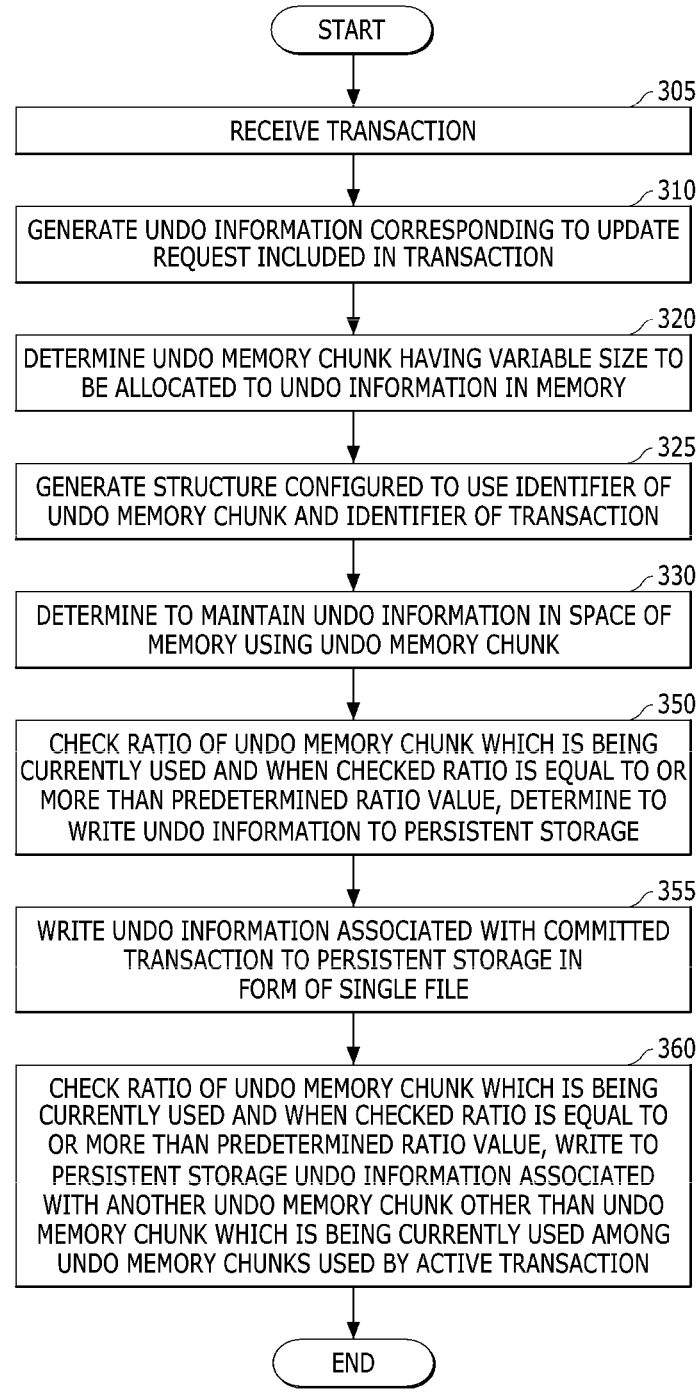

[Fig. 4]
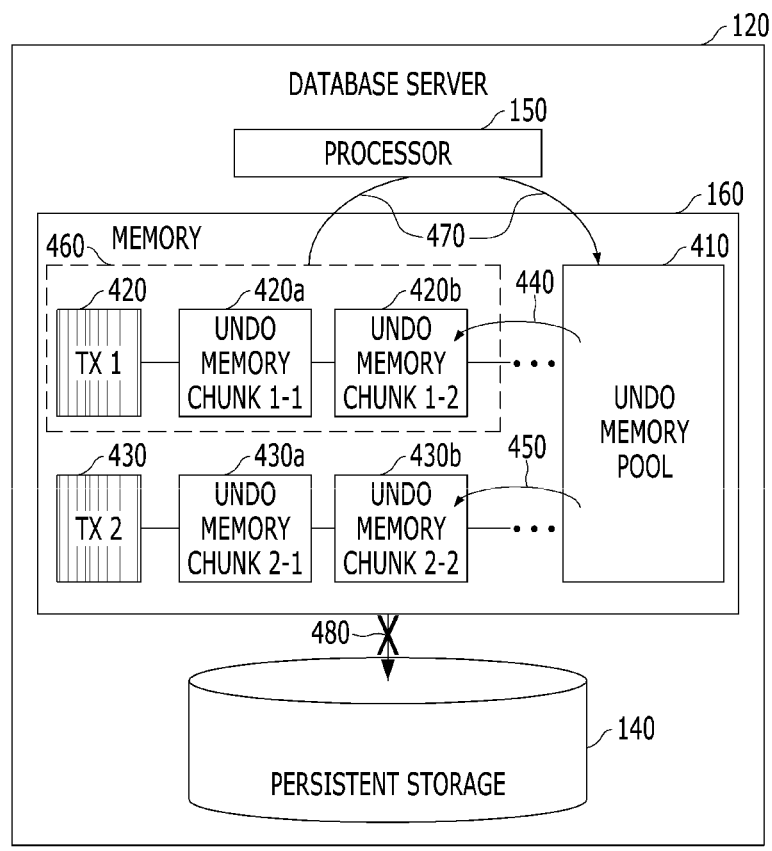

[Fig. 5]
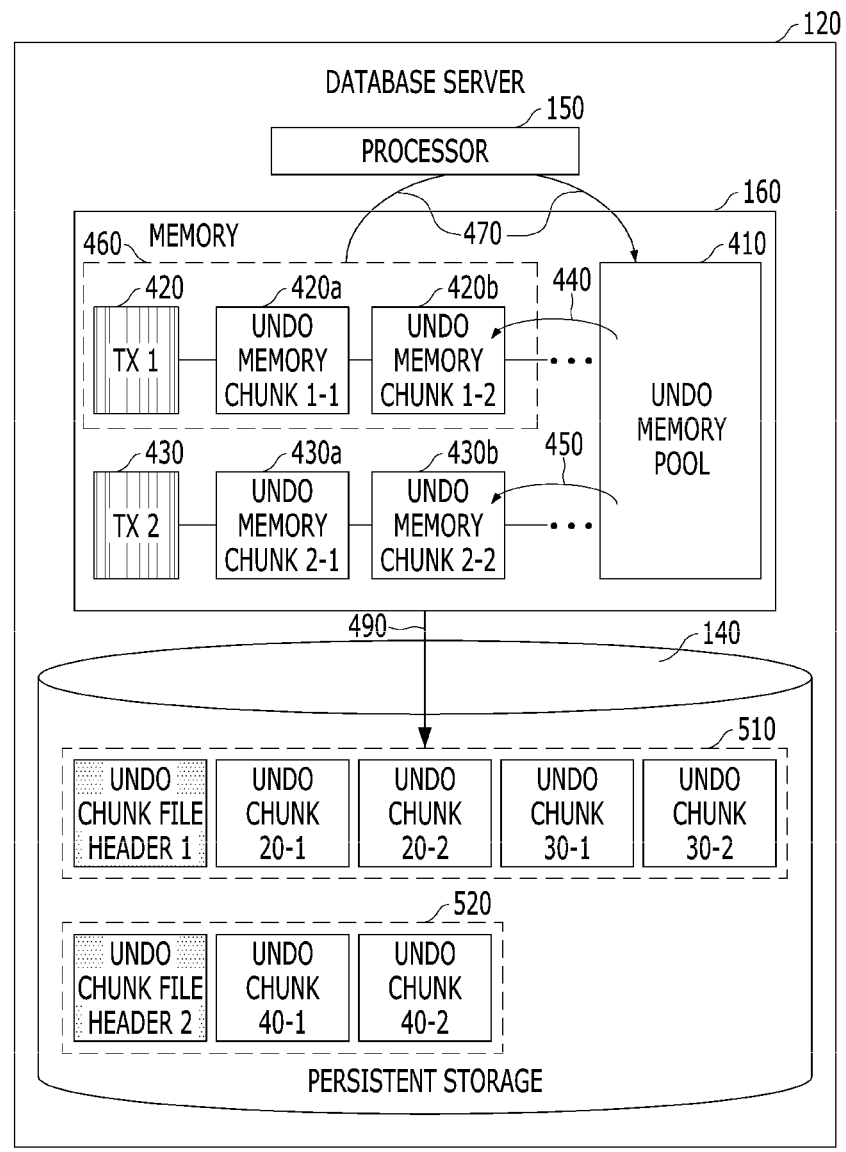

[Fig. 6]
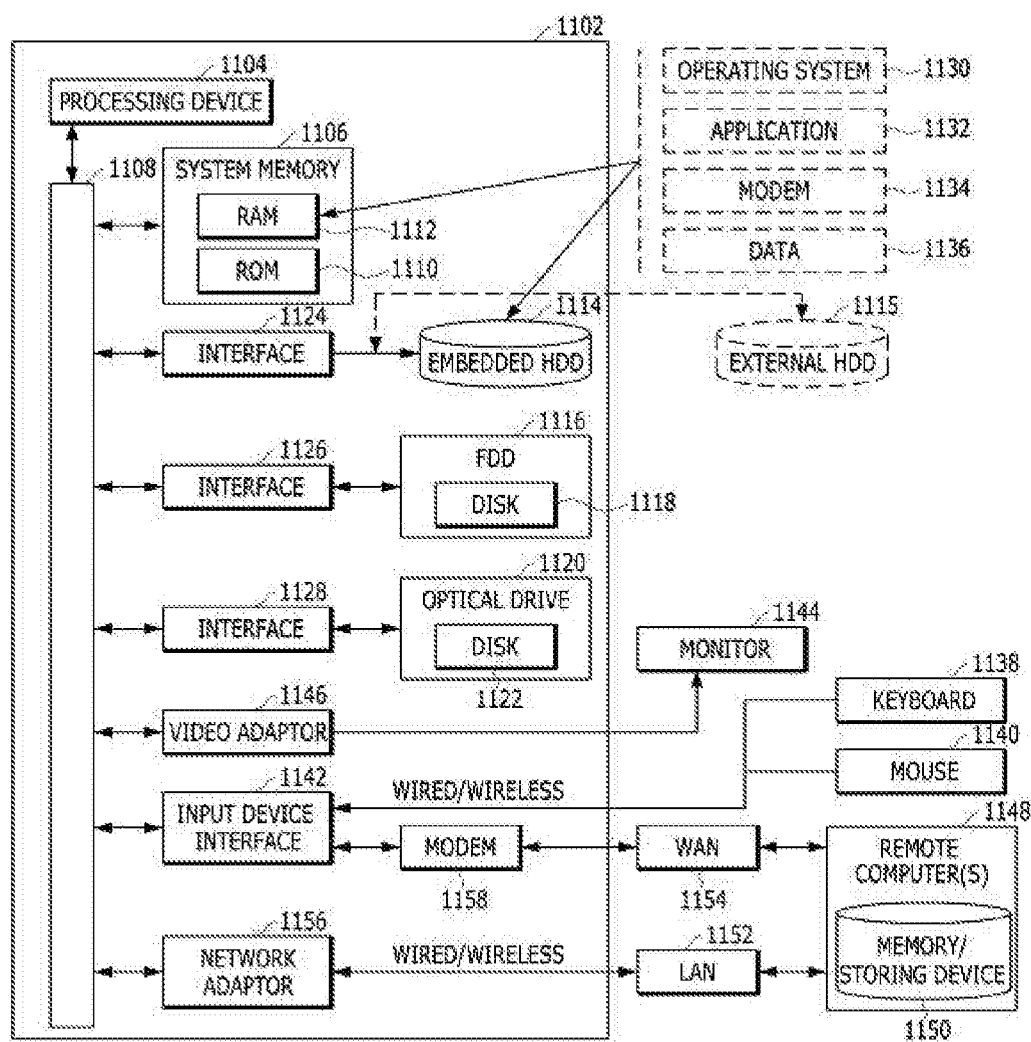

TECHNIQUE FOR LOG RECORDS MANAGEMENT IN DATABASE MANAGEMENT SYSTEM

CROSS-REFERENCE TO RELATED APPLICATIONS

This application claims priority to and the benefit of Korean Patent No. 10-2019-0029223 filed on Mar. 14, 2019 and the entire contents of which are incorporated herein by reference.

TECHNICAL FIELD

The present disclosure relates to a computer system, and more particularly, to a database management system (DBMS).

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, and scalability which are foundations of corporate business implementation.

In a database management system (DBMS), data may be stored in a data storage. In a relational database management system (RDBMS), the data storage may be referred to as a table. The table may include one or more rows and each of the one or more rows may include one or more columns.

When the database includes a large amount of data, it may take a relatively long time to perform a query to retrieve data in which a user is interested. When it takes a long time for the database to respond to the query, it may adversely affect performance of the database.

In the database management system, a "transaction" is generally referred to as an atomic set of operations performed in the database, which means a set of a series of operations. The database system guarantees atomicity, consistency, isolation, and durability with respect to the transaction. More specifically, the atomicity means characteristics related to All or Nothing that guarantees a state in which normally performing all operations of the transaction is completed or any operation is not performed. The consistency means characteristics that database states before and after performing the transaction should be different states in which the consistency is guaranteed, respectively when the performing of the transaction is regarded as a transition between database states. The isolation means characteristics that respective transactions should be independently performed without affecting performing of different transactions even though multiple transactions are simultaneously performed. Further, the consistency means characteristics that all changes related to the corresponding transaction should be preserved in the event of a failure in the future after the transaction is successfully completed and committed.

For example, when the transaction is processed, the transaction may access a table, data, and/or metadata or create, modify, or delete the accessed table, data, and/or metadata. When processing the transaction is completed, the transaction is committed and in this case, arbitrary change/update made by the database by the transaction may be (permanently) reflected to the database system. Since the transaction is the atomic set, all operations related to a specific transaction need to be simultaneously committed. Further, when some or all of the operations performed by the transaction may not be performed, the entire transaction is aborted and only a failed specific operation is not aborted. When the transaction is aborted, arbitrary changes to the database configured by the transaction are rolled back and the database may return to a previous state of the aborted transaction.

In general, a log may mean consecutive sets of log records and may be used for recording a change related operation. In general, the log may be recorded in an appended scheme and each log record may have a unique identifier. The identifier of the log record may be referred to as log sequence number (LSN) or log sequence address (LSA). As described above since the log is recorded in the appended scheme, the log identifier may have characteristics in that the log identifier monotonically increases.

The transaction log records may be used for performing an appropriate recovery operation in an event such as a system failure or transaction aborting. Transaction log records of different types may exist in the database system.

A "redo" record (log) means load information for recording all changes performed by the database. According to write ahead logging (WAL), respective changes for data are first recorded in the redo log and an actual change to a database block corresponding to changed data is thereafter made. The WAL may prevent a situation in which a version of database data which is immediately recovered from a disk accurately does not reflect a latest state of the database when the system failure occurs. Further, since a change of data which is not recorded in the disk, that is, which is configured only in a cache may be present before the failure, when the redo log appropriately maintains changes stored only in the cache, a system recovery may be performed in a scheme (roll forward scheme) of applying the redo log to the database until being consistent with a state immediately before the system failure. The redo log may be used for performing an operation of reflecting a task performed by a user to the database again for the system recovery when the system failure occurs.

As another type of log record, an "undo" record may be present. The undo record may be referred to as an "undo" segment or "roll-back" segment. The undo record includes information for rolling back a specific database operation. That is, the undo record may reverse a database task performed by the user and may be used for returning the task of the user to an original state. Further, in the process of the recovery, when a "rolling forward" process is applied to an uncommitted change(s), the undo record is applied to remove the uncommitted change(s) (i.e., rolled back). Further, when the transaction is aborted, the undo record may be applied to roll back the database to the existing state before the aborted transaction. When the database allows different transactions to view the database data at different times by using multi-versioning, the undo record may be used for generating multiple versions of the database which are consistent at different times.

For example, a scheme in which a failure of the database system occurs and the database system is restarted and recovered may be generally constituted by three steps. A first step is a log analyzing step. In the log analyzing step, it may be determined from which time recovering the database system needs to be started and what transactions are to be recovered while searching logs up to end of log (EOL) from a last check point time. A second step is a redo recovering step. In the redo recovering step, the recovery may be performed by using redo logs from the time when the recovery needs to be started up to the time when the failure occurs. A state of the database at the time when the redo recovery is completed may be the same as a state at the time when the failure occurs. That is, in the redo recovering step, a task of reproducing and recovering a situation immediately before the failure occurs as it is may be performed. A third step as an undo recovering step means a step of performing an undo recovery for logs of which undo recovery is required while reversely searching the logs from the end of log again. In the corresponding step, a scheme may be performed in which one or more transactions are rolled back in a state of the database recovered up to the failure occurrence time.

In the DBMS related industry, various efforts and developments are being made to implement log records in an efficient manner.

In this regard, U.S. Pat. Nos. 7,574,419, 6,976,022, and 6,981,004 present techniques for managing an undo log and a redo log.

SUMMARY OF THE INVENTION

The present disclosure has been made in an effort to efficiently implement undo related memory space utilization in a database management system.

The present disclosure has also been made in an effort to enhance stability and concurrency in the database management system.

An exemplary embodiment of the present disclosure provides a computer readable medium including a computer program including encoded commands. When the computer program is executed by one or more processors, the computer program allows the one or more processors to perform a method for managing undo information in a database management system (DBMS) and the method may include: determining an undo memory chunk on a memory to be allocated to undo information generated in response to an update request by a first transaction in the database management system (DBMS), the undo memory chunk having a variable size; maintaining the undo information on a space of the memory by using the determined undo memory chunk; and determining to transfer undo information associated with one or more transactions from the memory to a persistent storage when a ratio occupied by the allocated undo memory chunk in the memory is higher than a predetermined threshold ratio.

Another exemplary embodiment of the present disclosure provides a server for managing undo information in a database management system (DBMS). The server may include: a memory; and one or more processors operable in the memory. The one or more processors may perform an operation of determining an undo memory chunk on a memory to be allocated to undo information generated in response to an update request by a first transaction in the database management system (DBMS), the undo memory chunk having a variable size, an operation of determining to maintain the undo information on a space of the memory by using the determined undo memory chunk, and an operation of determining to transfer undo information associated with one or more transactions from the memory to a persistent storage when a ratio occupied by the allocated undo memory chunk in the memory is higher than a predetermined threshold ratio.

According to an exemplary embodiment of the present disclosure, undo related memory spatial utilization in a database management system can be efficiently implemented.

According to an exemplary embodiment of the present disclosure, stability and concurrency in the database management system can be enhanced.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

FIG. 1 is a schematic view of a system including a database server and a user terminal according to an exemplary embodiment of the present disclosure.

FIG. 2 is an exemplary flowchart of a method for managing undo information according to an exemplary embodiment of the present disclosure.

FIG. 3A is an exemplary flowchart of a method for managing undo information according to an exemplary embodiment of the present disclosure.

FIG. 3B is an exemplary flowchart of a method for managing undo information according to an exemplary embodiment of the present disclosure.

FIG. 4 schematically illustrates an exemplary internal structure and an operation scheme of a database server that performs a technique for managing undo information according to an exemplary embodiment of the present disclosure.

FIG. 5 schematically illustrates an exemplary internal structure and an operation scheme of a database server that performs a technique for managing undo information according to an exemplary embodiment of the present disclosure.

FIG. 6 illustrates a simple and general schematic view of an exemplary computing environment in which the exemplary embodiments of the present disclosure may be implemented.

DETAILED DESCRIPTION

The entire contents of U.S. patent Ser. No. 10/364,209 (METHOD AND MECHANISM FOR IDENTIFYING LAST TRANSACTION ON A ROW OF DATA) filed on Feb. 10, 2003 and U.S. patent Ser. No. 09/748,408 (METHOD AND APPARATUS FOR MAKING AVAILABLE DATA THAT WAS LOCKED BY A DEAD TRANSACTION BEFORE ROLLING BACK THE ENTIRE DEAD TRANSACTION) filed on Dec. 22, 2000, which are filed in the US Patent and Trademark Office in association with schemes for implementing undo and redo records, are incorporated herein by reference.

Various embodiments and/or aspects will be now disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Various aspects and features will be presented by a system which can include one or more apparatuses, terminals, servers, devices, components, and/or modules. It should also be appreciated and recognized that various systems can include additional apparatuses, terminals, servers, devices, components, and/or modules and/or that the various systems cannot include all of apparatuses, terminals, servers, devices, components, modules, and the like discussed in association with the drawings.

The scope of the claims for the method in the claims of the present disclosure arises from the functions and features described in each step, and is not affected by the order in which each step in the claims if a sequence relationship of the disclosure order in respective steps constituting the method is not specified. For example, in the claims set forth in the method including steps A and B, the scope of rights is not limited to the fact that step A precedes step B, even if step A is described before step B.

"Computer program", "component", "module", "system", and the like which are terms used in this specification may be used to be compatible with each other and refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

The components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, or the software.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that the singular form generally means "one or more" in the present specification and the claims.

The computer readable medium in the present specification may include all kinds of storage media storing programs and data so as to be readable by the computer system. The computer readable media in the present disclosure may include both computer readable storage media and computer readable transmission media. According to an aspect of the present disclosure, the computer-readable storage media may include a read only memory (ROM), a random access memory (RAM), a compact disk (CD)-ROM, a digital video disk (DVD)-ROM, a magnetic tape, a floppy disk, an optical data storage device, and the like. Further, the computer readable transmission media may include a predetermined medium of a type which is transmittable, which is implemented in a type of a carrier wave (e.g., transmissions through the Internet). Additionally, the computer readable media are distributed to systems connected through network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her invention by a best method.

In the present disclosure, the query means a predetermined request or command of requesting processing in a database server and may include, for example, data manipulation language (DML), data definition language (DDL), and/or PL/SQL. Further, the query in the present disclosure may mean a predetermined request issued from a user/developer. In addition, the query may mean a predetermined request input into a user terminal and/or the database server and processed in the user terminal and/or the database server.

In the present disclosure, "log", "log record", and "log information" may be used interchangeably with each other depending on a situation. In the present disclosure, the log record may mean a record for a redo log and/or an undo log and include predetermined types of data records to identify changes (e.g., changes related to tables, columns, rows, data types, indexes, etc.) of a value, a structure, and an organization of data in a database.

"Chunk" in the present disclosure is a term for expressing a unit for accommodating undo information and the undo information may be divided into one group referred to as chunk and stored in a memory or a persistent storage.

FIG. 1 is a schematic view of an exemplary database system including a user terminal 110 and a database server 120 according to an exemplary embodiment of the present disclosure.

As illustrated in FIG. 1, the system may include the user terminal 110 and the database server 120. The user terminal 110 and the database server 120 may be connected to each other by a predetermined network (not illustrated).

As illustrated in FIG. 1, the user terminal 110 may mean a predetermined type of node(s) in a database system having a mechanism for communication through a network. For example, the user terminal 110 may include a predetermined electronic device having connectivity with a personal computer (PC), a laptop computer, a workstation, a terminal, and/or the network. Further, the user terminal 110 may include a predetermined server implemented by at least one of agent, application programming interface (API), or plug-in. In addition, the user terminal 110 may include an application source and/or a client application.

The user terminal 110 may be a predetermined entity which includes a processor and a memory to process and store predetermined data. Further, the user terminal 110 in FIG. 1 may be related with a user which uses the database server 120 or communicates with the database server 120. In such an example, the user terminal 110 may issue the query to the database server 120. In an example, when the user terminal 110 generates a query to the database server 120, the corresponding query may be processed in the form of a transaction in the database server 120. That is, the user terminal 110 may allow the transaction to be generated and processed in the database server 120. The user terminal 110 may receive an application source created by a programming language by a developer, etc. Further, for example, the user terminal 110 compiles the application source to create the client application. For example, the created client application may be transferred to the database server 120 and thereafter, optimized and executed.

The database server 120 may include a predetermined type of computer system or computer device such as a microprocessor, a mainframe computer, a digital processor, a portable device, and a device controller. The database server 120 may include a database management system (DBMS) 130, a persistent storage 140, a processor 150, and a memory 160. In FIG. 1, one database server and one user terminal are exemplarily illustrated, but it will be apparent to those skilled in the art that more database servers (management apparatuses) and user terminals therethan may also be included in the scope of the present disclosure.

As illustrated in FIG. 1, the database server 120 may include one or more memories 160 including a buffer cache. Further, as illustrated in FIG. 1, the database server 120 may include one or more processors 150. Therefore, the DBMS 130 may be operated by the processor 150 on the memory 160.

The processor 150 may be constituted by one or more cores and may include predetermined types of processors for management of undo information, processing of the undo information, storing and removal of the undo information, data processing, data analysis, and deep learning, which include a central processing unit (CPU) of the computing device, a general purpose graphics processing unit (GPGPU), a tensor processing unit (TPU), and the like. The processor 150 may read a computer program stored in the memory 160 to perform an undo information management technique according to an exemplary embodiment of the present disclosure.

According to an additional embodiment of the present disclosure, the processor 150 may perform calculation for learning of a neural network in addition to managing and processing the undo information of the DBMS 130. In such an example, the processor 150 may perform calculations for learning the neural network, which include processing of input data for learning in deep learning (DN), extracting a feature in the input data, calculating an error, updating a weight of the neural network using backpropagation, and the like. At least one of the CPU, GPGPU, or TPU of the processor 110 may process learning of a network function. For example, the CPU and the GPGPU may together process the learning of the network function and data classification using the network function. Further, in an exemplary embodiment of the present disclosure, processors of a plurality of computing devices may be used together to process the learning of the network function and the data classification using the network function.

According to an exemplary embodiment of the present disclosure, the computer program executed by the user terminal 110 or the database server 120 may be a CPU, GPGPU, or TPU executable program. In the present disclosure, the memory 160 may store a computer program for performing a technique for managing and processing the undo information according to exemplary embodiments of the present disclosure and the stored computer program may be read and driven by the processor 150.

The processor 150 may determine to temporarily or permanently store any data and log information that is stored in association with the query being received from the user terminal 110 into the database server 120. The processor 150 may determine to store a data table and/or an index table. The processor 150 may determine a storage location of the stored data and/or log information on the memory 160 or a storage location on the persistent storage 150.

The memory 160 may store a program for a motion of the processor 150 therein and temporarily or permanently store input/output data (e.g., an update request, undo information, redo information, table information, index information, etc.). The memory 160 may include at least one type of storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The memory 160 may be operated by the control by the processor 150.

The memory 160 may store a data table including a data value. The data table may include the data value and in the exemplary embodiment of the present disclosure, the data value of the data table may be written in the persistent storage 140 from the memory 160. In an additional aspect, the memory may include the buffer cache and data may be stored in a data block of the buffer cache. As an example, the data stored in the data block of the buffer cache may be written in the persistent storage 140 by a background process.

The memory 160 may store the undo information generated in response to the update request by the transaction. Additionally, the memory 160 may store the redo information. The memory 160 may use at least a part of an available memory space possessed thereby as a space for storing the undo information by the unit of an undo memory chunk according to the control of the processor 150. Further, the memory 160 may hold the undo information in a memory space by using the undo memory chunk instead of the persistent storage 140.

The persistent storage 140 means a predetermined type of non-volatile storage which may consistently store predetermined data, such as a magnetic disk, an optical disk, and a magneto-optical storage device and a storage device based on a flash memory and/or a battery-backup memory. The persistent storage 140 may communicate with the processor and the memory of the database server 120 through various communication means. In an additional exemplary embodiment, the persistent storage 140 is positioned outside the database server 120 to communicate with the database server 120. Further, in FIG. 1, only one persistent storage and one DBMS are illustrated, but a type in which a plurality of DBMSs is connected to one persistent storage or a type including the plurality of persistent storages may also be included in the scope of the present disclosure.

The DBMS 130 as a program for permitting the database server 120 to perform operations including retrieval, insertion, modification, and/or deletion of required data may be implemented by the processor 150 in the memory 160 of the database server 120 as described above. According to an exemplary embodiment of the present disclosure, the DBMS 130 may implement operations for managing and processing the undo information by the processor 150. For example, the DBMS 130 may implement operations of generating undo information corresponding to the update request by the transaction in response to the update request according to the transaction, determining an undo memory chunk having a variable size to be allocated to the undo information, and allowing the undo information to be held on the memory by using the determined undo memory chunk. As another example, when the DBMS 130 determines the undo memory chunk to be allocated to the undo information, task amount information of a related transaction and the transaction may be at least partially based on information on the number of times of being allocated the undo memory chunk. As a result, since the DBMS 130 uses a variable undo memory chunk in order to accommodate the undo information without using an undo block managed like general data blocks on the persistent storage 140 and the memory 160, a memory space having a size suitable for the generated undo information (i.e., undo log) is used and the undo information is not principally written to the persistent storage 140. Such an operation of the DBMS 130 may solve a problem in that the undo block (log) which is unnecessary in operating the database remains in the persistent storage for a long time and a disk space is thus inefficiently used and also solve a problem in that a speed of accessing desired undo information (i.e., undo log) may become lower according to a cache algorithm.

The user terminal 110 and the database server 120 or the database management apparatuses may also communicate with each other through the network (not illustrated). The network according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. Additionally, the network may include a database link (dblink), and as a result, a plurality of database servers communicates with each other through the database link to fetch data from another database management apparatus. The techniques described in the present specification may also be used in other networks in addition to the aforementioned networks.

FIG. 2 is an exemplary flowchart of a method for managing undo information according to an exemplary embodiment of the present disclosure.

Steps illustrated in FIG. 2 are just exemplary and additional steps may be present or some of the steps may be omitted. The steps illustrated in FIG. 2 may be performed in the database server 120 or a separate agent server (not illustrated) for connecting database servers. Hereinafter, for convenience of description, it will be assumed and described that the steps illustrated in FIG. 2 are performed in the database server 120. Additionally, operations of the database server 120 described below may be interpreted as the operation of the processor 150.

The database server 120 may hold the memory 160 for storing log information. When the transaction which occurs in association with the query modifies a block(s), the database server 120 may write a corresponding modification history as the undo information (i.e., undo log). For example, the undo log or undo record may hold writing of rowid of an inserted row in the case of INSERT, a value before changing an updated column in the case of UPDATE, and deleted data in the case of DELETE.

When the transaction is processed, the log information (log record) may be generated with respect to each operation included in the transaction and the log information may be held in the memory 160 and written to a log file at some points of time. The log record held in the memory 160 may be output to the log file 1) in a case where a predetermined transaction requests the commit, 2) in a case of performing the WAL, and 3) in a case where the DBMS is internally required (e.g., in a case where necessity is present in a checkpoint operation, a log management operation, etc.). The database server 120 may temporarily accommodate the log information by the unit of a block having the same size by using the memory 160 and then, output the corresponding log information to the log file by the unit of the block. As such, when the undo block having the same size is allocated regardless of the task amount of the transaction, the undo block needs to be allocated several times or an empty space may exist in one undo block, and as a result, management of a memory space for accommodating the undo may be inefficient.

As described above, when the undo log related to the transaction is managed in the form of the block having the same size, the undo log is stored and managed in such a manner that all transactions are allocated blocks with the same unit size and store the undo log. In this case, when the same size of undo log storage spaces are allocated regardless of the task amount of the transaction, there is a problem in that it is necessary to allocate the undo block several times according to the situation or it is possible to allocate and use the block inefficiently such as leaving too much space in one undo block.

In general, the undo block is managed like general data blocks on the disk and the memory. Therefore, the undo block (log) which is already unnecessary in operating the database is left in the disk for a long time to inefficiently use the disk space and a problem in that a speed of accessing a desired undo log may become lower according to a cache algorithm also exists.

According to the undo information management technique according to an exemplary embodiment of the present disclosure, since the undo memory chunk may be variably allocated according to the task amount of the transaction or the size of the undo information, an access speed of the undo log for transaction processing may be enhanced and space utilization of the memory and the persistent storage (e.g., disk) of the undo log may be more efficiently implemented, thereby enhancing stability and concurrency of the transaction.

According to an exemplary embodiment of the present disclosure, in principle, since the processor 150 may hold the undo information in an efficient manner only on the memory 160 without being loaded to the persistent storage 150, memory space utilization and disk space utilization may be maximized and an operating speed of the database server 120 may be enhanced as compared with a case where the undo information is managed by the unit of a block having a fixed size and output to the persistent storage.

Referring back to FIG. 2, the database server 120 may receive update requests included in a transaction which occurs in association with execution of the database management system (DBMS) 130 (210).

The database server 120 may receive update requests included in a transaction which occurs in association with execution of the database management system (DBMS) 130 (210). The database server 120 may identify SQL-related operations that are generated with respect to one or more objects by confirming the transaction included in the update request. In this specification, the SQL-related operation may mean a predetermined type of database operation created in an SQL type. The SQL operation may include, for example, a data manipulation language (DML) operation, a data definition language (DDL) operation, and/or a data control language (DCL) operation. As an example of the case of the DML, the database server 120 may confirm DML information included in the transaction and identify which block is changed according to the operation such as INSERT, UPDATE, or DELETE.

The database server 120 may generate the undo information corresponding to the update request included in the transaction (220). As described above, the database server 120 may form the undo log for the purposes of later rollback or recovery of changes in the block. For example, when UPDATE occurs, the database server 120 may load information related to a block to be updated into the buffer cache from a data file and form the original information of the block before the UPDATE occurs as the undo information.

In an additional exemplary embodiment, the database server 120 may set a relationship between the generated undo information and updated data. In this case, the database server 120 may store the set relationship by forming a map structure. Such a map structure may include, for example, a meta table. Further, the map structure may, for example, include a relationship between a memory address and a disk address. In addition, the updated data may mean a changed data block.

The database server 120 may determine the undo memory chunk to be allocated to the undo information from an undo memory pool on the memory (230). The undo memory chunk in the present disclosure may mean a minimum unit allocated to the undo information or undo record in order to hold the undo information on the memory. The undo memory pool in the present disclosure may mean a set of the undo memory chunk or a space of an available undo memory chunk and include a logical or physical type of space. According to an exemplary embodiment of the present disclosure, the undo memory chunk for accommodating the undo information may have a variable size. For example, the size of a first undo memory chunk allocated to first undo information (including one or more first undo records) related to a first transaction may be set to be different from the size of a second undo memory chunk allocated to second undo information (including one or more second undo records) related to a second transaction.

In an exemplary embodiment, in determining the undo memory chunk, information on the number of times the transaction is allocated the undo memory chunk may be considered. For example, when a specific transaction is first allocated the undo memory chunk, it may be determined that a relatively small size (e.g., 1 k byte) undue memory chunk is allocated. Since the memory space may be wasted when a large number of transactions (for example, short transactions) with a small task amount are input, the size of the undo memory chunk which the transaction is first allocated may be set to be relatively small in order to maximize the utilization of the memory space. The undo memory chunk which the corresponding transaction is second allocated may have a relatively large size (e.g., 8 k byte) than the undo memory chunk which the transaction is first allocated. Therefore, the processor 150 may variably control the size of the undo memory chunk based on the number of times the transaction is allocated the undo memory chunk, thereby maximizing the utilization of the memory space for accommodating the undo information. Accordingly, a main repository of the undo information may be changed to the memory 150 rather than the persistent storage 140. In such a case, the access speed to the undo information may be enhanced.

In an exemplary embodiment, in determining the undo memory chunk, information on the task amounts of the operations included in the transaction may be considered. Here, the task amount information may include, for example, the number of operations included in the transaction, the size of data which the operations included in the transaction change, the size/number of undo information generated by the transaction or operation, and/or the number of data which the operations included in the transaction change. As described above, the task amount information may mean predetermined data that may quantitatively represent the transaction information and/or the undo information. For example, when there is a transaction involving a large amount of INSERT operations such as BATCH INSERT, the transaction may result in the generation of multiple undo information or the generation of large undo information. In this case, the undo memory chunk allocated to accommodate the undo information may have a large size such as 64 kbytes. Accordingly, since the processor 150 may variably allocate the undo memory chunk to the undo information in consideration of quantitative data of the undo information or the transaction information, it is possible to maximize the utilization of the memory space for accommodating the undo information. Accordingly, the main repository of the undo information may be changed to the memory 150 rather than the persistent storage 140. In such a case, the access speed to the undo information may be enhanced.

In an exemplary embodiment, in determining the undo memory chunk, the available memory size information in the undo memory pool may be considered. When the amount of available memory may accommodate the undo information, the undo information may be stored in the space of the memory 160, and otherwise the undo information may be stored in the persistent storage 140. For example, the processor 150 may determine whether to retain the undo information in the space of the memory 160 by comparing an allocable space size in the undo memory pool and the size of the undo memory chunk determined to be allocated to the undo information. When the processor 150 determines not to retain the undo information in the space of the memory 160, the processor 150 may determine to store at least some of the undo information in the persistent storage 140. Accordingly, the processor 150 determines the memory 160 as a priority for storing the memory 160 by considering the quantitative data of the undo information or transaction information and when the memory space is not available, the processor 150 may store the undo information in the persistent storage 140. Accordingly, since the undo information is preferentially recorded in the memory 160, the access speed of the undo information may be enhanced and the space of the memory 160 may be utilized efficiently.

According to an exemplary embodiment of the present disclosure, the database server 120 may form a structure that is configured to use the identifier of the undo memory chunk and the identifier of the transaction (240). The processor 150 forms a hash structure to use the identifier of the undo memory chunk and the identifier of the transaction as input values or input keys to allow the undo information stored in the memory 160 and/or the undo memory chunk allocated to the undo information to be retrieved. The hash structure described above may use a pointer to the undo memory chunk as an output entry. In this case, address or location information on the memory 160 for the undo memory chunk may be obtained with the ID of the undo memory chunk and the ID of the transaction. In this specification, the "identifier" may mean a predetermined type of indicator for identifying a specific object (for example, uniquely) and the identifier may include, for example, the ID.

For example, it is assumed that a transaction whose ID is "12345" is executed. As a result, it may be determined that four undo memory chunks of which IDs are "0000", "0001", "0002", and "0003" are allocated to the corresponding transaction. In such an example, when the transaction modifies "block 9287" and the ID of the undo memory chunk for accommodating the undo log information that modifies the block is "0003", the input entry or input key of the hash structure may have an exemplary form of "12345.0003". Therefore, when "12345.0003" is input to the hash structure, a pointer to the undo memory chunk may be obtained according to a hash operation of the hash structure. In such a scheme, in retaining the undo information on the memory 160, the undo memory chunk allocated to the undo information may be easily retrieved and managed.

In an additional exemplary embodiment, the database server 120 may generate a hash structure configured to use the ID of the undo memory chunk and the ID for the undo information associated with the transaction as the input key and to use the pointer or address information for the undo memory chunk as the entry of the output.

In the present disclosure, the hash structure refers to a predetermined type of object having a predetermined mapping algorithm for mapping data having a predetermined length to data having a fixed length and for example, a hash table or a hash bucket may be included in a definition of the hash structure. The hash structure may execute insertion, deletion, and search operations through the corresponding structure. In an exemplary embodiment, the input entry in the hash structure may be defined as a key or the input key and the output entry may be defined as a bucket value or a hash value.

In an exemplary embodiment, the hash structure may include a Direct-address table structure. In this case, since the number of keys and the size of the hash table are equal to each other, a problem such as a hash collision may be solved.

In an exemplary embodiment, the hash structure may include a Hash chaining structure. In this case, since there is no limitation on the number of entries that may be included in one bucket, all the data may be inserted into the hash table. In addition, such a hash chaining structure may be implemented by pointing to a next node by adding a node in a chain form when existing data inserted into the bucket exists.

In an exemplary embodiment, the hash structure may include an Open addressing structure. In this case, there is one entry that may be included in one bucket, and it may be allowed to store data at an address other than the address obtained by a hash function.

In an exemplary embodiment, the mapping algorithm of the hash structure may include a predetermined hash algorithm.

In an additional exemplary embodiment, subsequent undo information among a plurality of undo information associated with the transaction may be retained on the memory 160 to include a pointer value for pointing to the address of the undo memory chunk corresponding to preceding undo information. Accordingly, even when a plurality of undo information exists in one transaction and the undo information is scattered and retained over the space of the memory 160, connection between the undo information is possible, so that a return operation of the undo memory chunk may be easily implemented by the unit of the transaction.

In an exemplary embodiment of the present disclosure, the database server 120 may retain the undo information on the memory space by using the undo memory chunk (250). Further, the database server 120 may determine whether to return the used undo memory chunk to the undo memory pool (260).

In an exemplary embodiment, after allocating the undo memory chunk to the undo information and writing the undo information to the memory 160, the processor 150 may monitor whether a predetermined time period for retaining the undo information has elapsed from the time when the transaction is committed. The predetermined time period for retaining the undo information may include a default time period determined on the database server 120. Further, the predetermined time period for retaining the undo information may include a time period received from the user terminal 110.

The predetermined time period for retaining the undo information may be dynamically changed. In such a case, for example, the predetermined time period for retaining the undo information according to the task amount information for the transaction may be variably determined by the unit of the transaction. Additionally, the predetermined time period for retaining the undo information may be variably determined based on usage pattern information of the user terminal 110.

The predetermined time period for retaining the undo information may be variably determined based on a predetermined type of deep learning algorithm. Through the deep learning algorithm, a time period for retaining variable undo information may be variably determined by the unit of the transaction by synthesizing a usage pattern of the user terminal 110, a processing capability of the database server 120, and/or the task amount information of the transaction.

The deep learning algorithm may be implemented using a neural network (network function) and the neural network may consist of a set of interconnected calculation units, which may be referred to generally as the "node". The "nodes" may also be called "neurons". The neural network is configured to include one or more nodes. The nodes (alternatively, neurons) constituting the neural networks may be connected to each other by one or more "links". In the neural network, one or more nodes connected through the link may relatively form the relation between an input node and an output node. Concepts of the input node and the output node are relative and a predetermined node which is in the output node relation with respect to one node may have the input node relation in the relation with another node and vice versa. As described above, the relationship of the output node to the input node may be generated based on the link. One or more output nodes may be connected to one input node through the link and vice versa. In the relation of the input node and the output node connected through one link, a value of the output node may be determined based on data input in the input node. Here, a node connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes. As described above, in the neural network, one or more nodes are connected to each other through one or more links to form the input node and output node relations in the neural network. A characteristic of the neural network may be determined according to the number of nodes, the number of links, correlations between the nodes and the links, and values of the weights granted to the respective links in the neural network. For example, when the same number of nodes and links exist and two neural networks in which the weight values of the links are different from each other exist, it may be recognized that two neural networks are different from each other.

The neural network may be configured to include one or more nodes. Some of the nodes constituting the neural network may constitute one layer based on distances from an initial input node. For example, an aggregation of nodes of which the number of distances from the initial input node is n may constitute an n layer. The distance from the initial input node may be defined by the minimum number of links required for reaching the corresponding node from the initial input node up to the corresponding node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network. In the neural network according to an exemplary embodiment of the present disclosure, the number of nodes of the input layer may be the same as the number of nodes of the output layer, and the neural network may be a neural network of a type in which the number of nodes decreases and then, increases again as the layer progresses from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases as the layer progresses from the input layer to the hidden layer. Further, in the neural network according to an exemplary embodiment of the present disclosure, the number of nodes of the input layer may be larger than the number of nodes of the output layer, and the neural network may be a neural network of a type in which the number of nodes increases as the layer progresses from the input layer to the hidden layer. The neural network according to an exemplary embodiment of the present disclosure may be a neural network of a type in which the neural networks are combined.

A deep neural network (DNN) may refer to a neural network that includes a plurality of hidden layers in addition to the input and output layers. When the deep neural network is used, latent structures of data may be determined. The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The disclosure of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction of the output layer (symmetrical to the input layer) in the bottleneck layer. The auto encoder may perform non-linear dimensional reduction. The number of input and output layers may correspond to the number of sensors remaining after preprocessing the input data. The auto encoder structure may have a structure in which the number of nodes in the hidden layer included in the encoder decreases as a distance from the input layer decreases. When the number of nodes in the bottleneck layer (a layer having a smallest number of nodes between an encoder and a decoder) is too small, sufficient amount of information may not be delivered, and as a result, the number of nodes in the bottleneck layer may be maintained to be a specific number or more (e.g., half of the input layers or more).

The neural network in the present disclosure may be learned in at least one scheme of supervised learning, unsupervised learning, or semi supervised learning. Learning of the neural network is to minimize errors in output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

Thus, according to an exemplary embodiment of the present disclosure, after the undo memory chunk is allocated to the undo information and the undo information is written to the memory 160, the processor 160 may determine whether to return the undo memory chunk to the undo memory pool. By such a scheme, the availability of the undo memory pool may be increased, so that efficient management of the undo information may be achieved.

In an exemplary embodiment of the present disclosure, the database server 120 may determine whether committed transactions exist prior to the start time of an open cursor which currently exists and then return the undo memory chunk used for the undo information associated with the committed transaction to the undo memory pool. A "point of time" in the present disclosure may mean absolute time information and mean logical time information (e.g., system commit number (SCN) or tibero sequence number (TSN)) in the DBMS 130.

In an exemplary embodiment, the database server 120 may determine whether there are transactions that have been committed before the start time of the open cursor of which start time is earliest among the open cursors currently existing in the DBMS 130. Then, the database server 120 may determine to return the undo memory chunk used for the undo information associated with the transactions that have been committed before the start time of the open cursor of which start time is earliest among the open cursors which currently exist to the undo memory pool. According to the above-described scheme, since the used undo memory chunk may be timely returned to the undo memory pool, the database server 120 may efficiently use the memory space that may be relatively limited compared to the persistent storage 140. Further, since the database server 120 may retain the undo information with the memory 160 as the priority as compared with the persistent storage 140 by using the aforementioned scheme, utilization of the memory 160 of which the access speed is relatively high may be maximized. As a result, the usage of the cache algorithm may be maximized and the access speed to desired undo information may be increased.

According to an exemplary embodiment of the present disclosure, since the undo block is not managed like the general data blocks in the memory/persistent storage by using the undo memory chunk having the variable size, a problem that the database server 120 inefficiently uses the storage space as unnecessary undo information is left in the persistent storage 140 for a long time in operating the database may be solved.

In an exemplary embodiment of the present disclosure, the database server 120 may use a thread (i.e., a dedicated thread) dedicated to undo information management in order to perform the method illustrated in FIG. 2. In an exemplary embodiment, a step of generating the undo information and allocating the undo memory chunk to the undo information may be performed by each working thread and steps of returning the undo memory chunk used may be performed by one dedicated thread. In another exemplary embodiment, there may be a first dedicated thread used to generate the undo information, a second dedicated thread used to allocate the undo memory chunk to the undo information, and a third dedicated thread used to return the used undo memory chunk, so that respective detailed steps may be performed by independent dedicated threads, respectively. Additionally, the thread that is dedicated to the undo information management may retain list information for transactions that have been committed. Further, the thread that is dedicated to the undo information management may retain list information including information on a point of time when the transactions are committed.

In an exemplary embodiment of the present disclosure, there may be a dedicated thread that takes charge of managing the lifetime of the undo information. In this case, the dedicated thread that takes charge of managing the lifetime of the undo information may exclusively perform detailed operations of step 260 in FIG. 2. Since the thread dedicated to the undo information management includes the list information including the information on the commit time of the transactions, it is possible to compare the oldest cursor opening time with the transaction commit time in the list information. For example, the dedicated thread that takes charge of managing the lifetime of the undo information may (periodically) monitor whether the minimum time to retain the undo information has passed and/or (periodically) monitor whether the committed transaction exists before the oldest cursor opening time. As a result, the dedicated thread that takes charge of managing the lifetime of the undo information may perform an operation of returning the undo memory chunk of the transaction in which the minimum time to retain the undo information has elapsed to the undo memory pool. Further, the dedicated thread that takes charge of managing the lifetime of the undo information may perform an operation of returning the undo memory chunk of the transaction in which even the commit is completed before the oldest cursor opening time to the undo memory pool.

As described above, through the use of the dedicated thread according to an exemplary embodiment of the present disclosure, the undo information management and/or lifetime management of the undo information may be performed in parallel using a plurality of threads existing in one process, and as a result, an effect that the undo information may be retained in the memory preferentially may be achieved. Moreover, through the use of the dedicated thread according to an exemplary embodiment of the present disclosure (for example, through the usage of the dedicated thread for taking charge of the lifetime management of the undo information), a large amount of undo information may be stored in a limited memory 160 as compared with the persistent storage 140, thereby enhancing the access speed to the undo information and improving the problem in inefficient space usage. For example, since the dedicated thread for taking charge of the lifetime management of the undo information exclusively performs returning of the undo memory chunk allocated to the undo information, the undo memory chunk may be quickly returned without a temporal delay.

FIG. 3A is an exemplary flowchart of a method for managing undo information according to an exemplary embodiment of the present disclosure.

Steps illustrated in FIG. 3A are just exemplary and additional steps may be present or some of the steps may be omitted. The steps illustrated in FIG. 3A may be performed in the database server 120 or a separate agent server (not illustrated) for connecting database servers. Hereinafter, for convenience of description, it will be assumed and described that the steps illustrated in FIG. 3A are performed in the database server 120. Additionally, operations of the database server 120 described below may be interpreted as the operation of the processor 150.

Referring back to FIG. 3A, the database server 120 may receive update requests included in a subsequent transaction which occurs in association with execution of the database management system (DBMS) 130 (305). In FIG. 3A, for convenience of description, assumed is a situation in which after writing the "preceding" transaction is completed in FIG. 2, the "subsequent" transaction is input. However, it will be apparent to those skilled in the art that at least some of the steps described in FIG. 3A may be similarly applied even to a "first" or "preceding" transaction other than the subsequent transaction. Further, step 305 of FIG. 3A is a step of receiving the update request or transaction and the corresponding step is described above in step 210 of FIG. 2, and as a result, for convenience of description, herein, a detailed description of step 305 will be omitted.

The database server 120 may generate the undo information corresponding to the update request included in the subsequent transaction (310). Since the step of generating the undo information is described above in the undo information generating step (220) in FIG. 2, the detailed description of the corresponding step will be herein omitted.

The database server 120 may determine a location to store the undo information associated with the subsequent transaction based on the available memory size information of the undo memory pool (315). Based on the available memory size information of the undo memory pool, the database server 120 may determine whether to store the undo information associated with the transaction in the memory using the undo memory chunk or whether to store the undo information associated with the transaction in the form of a file in the persistent storage. For example, the database server 120 may compare the size of the available memory in the current undo memory pool and the size of the undo memory chunk determined to be allocated to current undo information. In such an example, when the database server 120 determines that the size of the undo memory chunk determined to be allocated to the current undo information is larger, the database server 120 may determine to write the corresponding undo information to the persistent storage 140. In this case, steps 340 and 345 in FIG. 3 may be performed.

When the database server 120 determines that the size of the available memory in the current undo memory pool is larger, the database server 120 may determine to write the corresponding undo information to the memory 160. In this case, steps 320, 325, 330, and 335 in FIG. 3 may be performed. Steps 320, 325, 330, and 335 in FIG. 3 may correspond to steps 230, 240, 250, and 260 in FIG. 2, respectively. Accordingly, in order to prevent duplication of description, specific features of steps 320, 325, 330, and 335 for FIG. 3A will be replaced with descriptions of steps 230, 240, 250, and 260 in FIG. 2.

When the undo information is determined to be stored in the persistent storage, the database server 120 may group the committed transactions and configure the grouped committed transactions as one file (340). Then, the database server 120 may store one file in which a plurality of transactions is grouped in the persistent storage (340). Since importance of the undo information (undo log) is relatively low with respect to uncommitted transactions (for example, since a probability to access the undo information becomes low), the database server 120 may write the plurality of transactions as one file. As a result, efficiency may be achieved in storage space management and file management in the persistent storage 140. In this case, one file name representing the plurality of transactions may be allocated to the one file.

The database server 120 may configure the respective uncommitted transactions with individual files for each transaction (340). Then, the database server 120 may store one or more transactions in the persistent storage as the individual files (340). In an exemplary embodiment, since the importance of the undo information (undo log) is relatively high with respect to the uncommitted transaction, the database server 120 may store the respective transactions in the persistent storage 140 as the individual files. In this case, names of the individual files containing the respective transactions may be named identifiers of the transactions.

After the database server 120 stores the undo information in the persistent storage 140 in the form of the file, the database server 120 is committed by the thread dedicated to managing the undo information and/or the database server 120 may determine to remove the undo information related to a transaction in which a predetermined undo retaining period has elapsed from the persistent storage 140 (345). As described above, since the dedicated thread may take charge of the lifetime management of the undo information stored in the persistent storage 140, management and removal of the undo information are quickened, and as a result, utilization of the storage space of the persistent storage 140 may be increased.

As described above, the database server 120 may use a policy of primarily storing the undo information in the memory 160, but secondarily storing the undo information in the persistent storage 140 by considering a capacity of the memory 160. In general, a type is used which stores the undo log in the undo block in order to store the undo log in the persistent storage in processing the transaction. In this case, since even undo logs which need not be written to the persistent storage are loaded on the undo block, inefficiency may occur in the undo log management. According to an exemplary embodiment of the present disclosure, since the undo log is written to the persistent storage 140 only in a specific situation in which the undo log is written to the persistent storage 140, the undo log is efficiently managed and the utilization of the storage space of the database server 120 is increased.

When the undo information is written to the persistent storage 140, the log information for the committed transactions is written to the persistent storage 140 as one file, thereby reducing overhead of file management. Further, since the names of the individual file for loading the uncommitted transaction are called the identifier (e.g., ID) of the corresponding transaction, the overhead of the file management in the persistent storage 140 may be reduced and the file may be easily retrieved.

Although not illustrated in FIG. 3A, in an additional exemplary embodiment of the present disclosure, the database server 120 may determine to store "header information (meta information)" in the undo information associated with the transaction in the memory 160 by using the undo memory chunk and store remaining information (e.g., undo CV information for rolling back the changes) (e.g., payload information) other than the header information (meta information) among the undo information associated with the transaction in the persistent storage in the form of the file based on the available memory size information of the undo memory pool. The payload information in the present disclosure may mean the remaining part other than the header information (meta information) from the file storing the undo information. Additionally, the payload information may mean an undo chunk other than the header information (meta information). Through the aforementioned scheme, since only the header information (meta information) having information of the undo chunk memory is cached to the memory 160, a usage rate of the memory 160 in managing the undo information may be maximized. As a result, the access speed to the undo information may be enhanced and the storage space may be efficiently used in storing/managing the undo information.

FIG. 3B is an exemplary flowchart of a method for managing undo information according to an exemplary embodiment of the present disclosure.

Steps illustrated in FIG. 3B are just exemplary and additional steps may be present or some of the steps may be omitted. The steps illustrated in FIG. 3B may be performed in the database server 120 or a separate agent server (not illustrated) for connecting database servers. Hereinafter, for convenience of description, it will be assumed and described that the steps illustrated in FIG. 3B are performed in the database server 120. Additionally, operations of the database server 120 described below may be interpreted as the operation of the processor 150.

Step 305 of FIG. 3B is a step of receiving the update request or transaction and the corresponding step is described above in step 210 of FIG. 2, and as a result, for convenience of description, hereinafter, a detailed description of step 305 will be omitted.

The database server 120 may generate the undo information corresponding to the update request included in the transaction (310). Since the step of generating the undo information is described above in the undo information generating step (220) in FIG. 2, the detailed description of the corresponding step will be hereinafter omitted.

The database server 120 may determine the undo memory chunk having the variable size to be allocated to the undo information from the undo memory pool on the memory 160 (320), generate a structure configured to use the identifier of the undo memory chunk and the identifier of the transaction (325), and determine to write the undo information to the memory 160 by using the undo memory chunk (330). In this case, steps 320, 325, and 330 in FIG. 3B may correspond to steps 230, 240, and 250 in FIG. 2, respectively. Accordingly, in order to prevent duplication of description, specific features of steps 320, 325, and 330 for FIG. 3B will be replaced with descriptions of steps 230, 240, and 250 in FIG. 2.

Basically, the undo log information generated by the transaction may be stored in the memory 160. In this case, the undo information may be stored in the memory 160 according to a scheme in which the undo memory chunk is allocated and the generated undo log information is loaded on the allocated undo memory chunk. The thread dedicated to the undo information management, such as an undo manager thread may confirm a ratio or an absolute amount of the undo memory chunk which is being currently used and when it is determined that the corresponding ratio or absolute amount is equal to or more than or more than a predetermined value or a predetermined value, it may be determined that the undo information needs to be written to the persistent storage 140 such as the disk (350). By step 350, the undo information stored in the memory 160 may be grouped into one file and transferred to the persistent storage 140 from the memory 160. For example, it may be check what degree of a ratio of a memory space allocated to store the current undo information to the memory space for managing the undo information is and when the ratio exceeds a predetermined threshold ratio (e.g., 80%), it may be determined that at least some of the undo information stored in the memory 160 is transferred to the persistent storage 140.

In this case, the undo information associated with the committed transaction may be written to the persistent storage in the form of the file (e.g., grouped and stored in one file form or stored as the individual file for each transaction) (355). Since the importance of the undo information (undo log) is relative low with respect to the committed transactions (for example, since the probability to access the undo information becomes low), the database server 120 may write the plurality of transactions as one file. As a result, efficiency may be achieved in storage space management and file management in the persistent storage 140. In this case, one file name representing the plurality of transactions may be allocated to the one file.

After the undo information associated with the committed transaction is grouped and written to the permanent storage 140 in the form of one file (or as the individual file for each transaction), the thread dedicated to the undo information management, such as the undo manager thread may additionally confirm the ratio of the undo memory chunk which is being currently used.

When the undo manager thread additionally confirms the ratio of the undo memory chunk which is being currently used and the additionally confirmed ratio is also determined to be equal to or more than a predetermined ratio value, the database server 120 may write to the persistent storage 140 undo information associated with another undo memory chunk other than the undo memory chunk which is being currently used among undo memory chunks which Active transaction (i.e., a transaction which is not committed) uses. By such a scheme, storing the undo information in the memory 160 is determined as a primary policy and storing the undo information in the persistent storage 140 is determined as a secondary policy and when the available space in the undo memory pool is small even by the secondary policy, at least some of the undo information associated with the Active transaction which is not currently committed as a third rank may be stored in the persistent storage 140.

For example, it is assumed that undo memory chunks to which numbers No. 1, No. 2, No. 3, and No. 4 are allocated, respectively exist in association with the first transaction (i.e., active transaction) that is not currently committed. Further, it is assumed that the first transaction temporally first generates the undo memory chunk having a number of No. 1 and then generates the undo memory chunk having the numbers of No. 2, No. 3, and No. 4 and at present, the undo memory chunk having the number of No. 4 contains the undo log. That is, the undo memory chunks of No. 1 to No. 4 are the undo memory chunks associated with the Active transaction and among them, the undo memory chunk having the number of No. 4 may correspond to the undo memory chunk which the first transaction is currently used. Under the assumption, when the database server 120 determines that the memory space is insufficient even after writing the undo memory chunk associated with the committed transaction to the persistent storage 140, the database server 120 may determine to store in the persistent storage 140 the undo memory chunks having the remaining numbers of No. 1 to No. 3 other than the undo memory chunk having the number of No. 4 in the aforementioned example. The undo memory chunks having the numbers of No. 1 to No. 3 may be grouped and stored as one file or individually stored as an individual file name. In an additional exemplary embodiment, the database server 10 may configure the respective uncommitted transactions with individual files for each transaction. Then, the database server 120 may store one or more transactions in the persistent storage 140 as the individual files. Since the importance of the undo information (undo log) is relatively high with respect to the uncommitted transaction (that is, since the probability to access the undo information becomes high), the database server 120 may store the respective transactions in the persistent storage 140 as the individual files. In this case, names of the individual files containing the respective transactions may be named identifiers of the transactions.

After the database server 120 stores the undo information in the persistent storage 140 in the form of the file, the database server 10 is committed by the thread dedicated to managing the undo information and/or the database server 120 may determine to remove the undo information related to a transaction in which a predetermined undo retaining period has elapsed from the persistent storage 140. As described above, since the dedicated thread may take charge of the lifetime management of the undo information stored in the persistent storage 140, management and removal of the undo information are quickened, and as a result, utilization of the storage space of the persistent storage 140 may be increased.

As described above, the database server 120 may use a policy of primarily or principally storing the undo information in the memory 160, but secondarily storing the undo information in the persistent storage 140 by considering a capacity of the memory 160. In general, a type is used which stores the undo information (log) in the undo block in order to store the undo information in the persistent storage in processing the transaction. In this case, since even undo information which need not be written to the persistent storage is loaded on the undo block, inefficiency may occur in the undo information (log) management. According to an exemplary embodiment of the present disclosure, since the undo information is written to the persistent storage 140 only in a specific situation in which the undo information is principally stored in the memory 160, but is written to the persistent storage 140, the undo information (log) is efficiently managed and the utilization of the storage space of the database server 120 is increased.

When the undo information is written to the persistent storage 140 in the form of the file, the log information for the committed transactions is written to the persistent storage 140 as one file, thereby reducing overhead of file management. Further, since the names of the individual file for loading the uncommitted transaction are called the identifier (e.g., ID) of the corresponding transaction, the overhead of the file management in the persistent storage 140 may be reduced and the file may be easily retrieved.

Although not illustrated in FIG. 3B, in an additional exemplary embodiment of the present disclosure, the database server 120 may determine to store "header information (meta information)" in the undo information associated with the transaction in the memory 160 by using the undo memory chunk and store remaining information (e.g., undo CV information for rolling back the changes) (e.g., payload information) other than the header information (meta information) among the undo information associated with the transaction in the persistent storage in the form of the file based on the available memory size information of the undo memory pool. Through the aforementioned scheme, since only the header information having information of the undo chunk memory is cached to the memory 160, a usage rate of the memory 160 in managing the undo information may be maximized. As a result, the access speed to the undo information may be enhanced and the storage space may be efficiently used in storing/managing the undo information.

That is, when the undo memory chunks of one or more transactions are downloaded to the persistent storage 140 in the form of the file, the meta information of Transaction id+file_offset (location of the undo log) of the transactions constituting the file may be stored in a file header. As a result, the file header is placed in front of the payload information of the file and since the file header is loaded on the memory 160, a quick access to the file becomes possible.

When the file header information is uploaded to the memory 160, a partial another part of the undo memory space may be allocated without using the undo memory chunk.

In an exemplary embodiment of the present disclosure, when one or more blocks associated with the update request by the transaction need to be disk-flushed, undo information retained in the space of the memory corresponding to a block that needs to be disk-flushed or undo information of the uncommitted transaction among transactions corresponding to the block that needs to be disk-flushed may be together written to the persistent storage.

In an exemplary embodiment of the present disclosure, the database server 120 may determine to retain the undo information in a specific space of the memory by using the undo memory chunk and then transfer undo information on a transaction associated with uncommitted modifications from the memory to the persistent storage when a block having uncommitted modifications uploaded to the buffer cache needs to be disk-flushed. Further, the database server 120 may determine to store the undo information in the persistent storage by configuring the uncommitted transactions as the individual files for each transaction.

In an exemplary embodiment of the present disclosure, when a ratio or an absolute amount occupied by the allocated undo memory chunk in the memory is lower than a threshold value, the database server 120 may determine to transfer a persistent-storage-stored undo information, which was transferred from the memory to the persistent storage back to the memory again by the unit of the transaction or by the unit of the undo memory chunk based on the hash table.

In an exemplary embodiment of the present disclosure, after determining to transfer the undo information associated with one or more transactions from the memory to the persistent storage, the database server 120 may perform a scheme of transferring to the persistent storage undo information with a smaller number of access times for a predetermined time period preferentially over undo information with a larger number of access times. In an exemplary embodiment of the present disclosure, after determining to transfer the undo information associated with one or more transactions from the memory to the persistent storage, the database server 120 may perform a scheme of transferring to the persistent storage undo information in which the commit is associated with the transaction preferentially. Among the aforementioned schemes, two may be together applied.

FIG. 4 schematically illustrates an exemplary internal structure and an operation scheme of a database server that performs a technique for managing undo information according to an exemplary embodiment of the present disclosure.

As illustrated in FIG. 4, the database server 120 may include a processor 150, a memory 160, and a persistent storage 140. The processor 150 may perform the method described in FIGS. 2 and 3.

In the example of FIG. 4, when transaction 1 420 is initiated, undo memory chunk 1-1 420a and undo memory chunk 1-2 420b may be used from an undo memory pool 450 in order to store a plurality of undo information associated with transaction 1 420 (440). When transaction 2 430 is initiated, undo memory chunk 2-1 430a and undo memory chunk 2-2 430b may be used from the undo memory pool 450 in order to store a plurality of undo information associated with transaction 2 430 (450).

The size of each of the undo memory chunks for loading undo information associated with transactions 420 and 430 may be variably determined by various algorithms, as illustrated in FIG. 2. For example, since undo memory chunk 1-1 420a precedes undo memory chunk 1-2 420b (that is, since undo memory chunk 1-1 420a is allocated earlier than undo memory chunk 1-2 420b), undo memory chunk 1-1 420a may have a smaller size than undo memory chunk 1-2 420b. Since undo memory chunk 2-1 430a precedes undo memory chunk 2-2 430b (that is, since undo memory chunk 2-1 430a is allocated earlier than undo memory chunk 2-2 430b), undo memory chunk 2-1 430a may have a smaller size than undo memory chunk 2-2 430b. Further, in FIG. 4, it is illustrated that the sizes of the undo memory chunks are the same as each other, but the sizes of the undo memory chunks may be variable according to the algorithms described in FIG. 2.

In FIG. 4, it is expressed that respective transactions 420 and 430 are associated with two undo memory chunks, but more or less undo memory chunks therethan may be allocated. Further, the size of each of the allocated undo memory chunks may be variably determined at least partially based on the number of blocks associated with the operation involving the transaction, the task amounts of the operations, and/or a change amount of data.

As illustrated in FIG. 4, after the processor 150 determines the size of the available memory of the undo memory pool 410 and the size of the undo memory chunk to be allocated to the undo information in communication with the undo memory pool 410 (470), the undo memory chunk(s) having the variable size may be allocated to undo information 460 generated as transaction 1 420 is initiated. Further, the processor 150 may return the allocated undo memory chunk to the undo memory pool 410 through the dedicated thread.

In FIG. 4, since the undo memory pool 410 has a sufficient free space, as illustrated at 480, the undo information may not be written to the persistent storage 140, but the undo information associated with the transaction may be loaded and managed on the memory 160. As a result, usage efficiency of an undo related memory space may be increased and the stability and the concurrency of the entire database server 120 may be enhanced.

FIG. 5 schematically illustrates an exemplary internal structure and an operation scheme of a database server that performs a technique for managing undo information according to an exemplary embodiment of the present disclosure.

As illustrated in FIG. 5, the database server 120 may include a processor 150, a memory 160, and a persistent storage 140. The processor 150 may perform the method described in FIGS. 2 and 3. In FIG. 5, when it is determined that a space to store the undo information in the memory 160 is insufficient, the processor 150 may write the undo information to the persistent storage 140 in the form of the file by the unit of the transaction (490).

Reference numeral 510 of FIG. 5 represents that undo chunks associated with a plurality of committed transactions are stored in the persistent storage 140 as a single file 510. The file 510 may include undo chunk file header information and undo chunk information. An undo chunk 20-1 and an undo chunk 20-2 are undo chunks for loading undo information included in a single transaction (e.g., transaction 20). An undo chunk 30-1 and an undo chunk 30-2 are undo chunks for loading undo information included in a single transaction (e.g., transaction 30). The single file 510 may include undo information (i.e., undo chunks) associated with the plurality of transactions (i.e., transaction 20 and transaction 30). As an example, a name of the single file 510 may become "Transactions 20 and 30".

Reference numeral 520 of FIG. 5 represents that undo chunks associated with a single uncommitted transaction are stored in the persistent storage 140 as a single file 520. The single file 520 may include the undo chunk file header information and the undo chunk information. An undo chunk 40-1 and an undo chunk 40-2 may mean undo information associated with a single transaction (e.g., transaction 40). That is, since the transaction is not committed, a roll-back possibility for the corresponding transaction (transaction 40) a possibility of supporting multi versioning concurrent control (MVCC), or a possibility of recovery exists, and as a result, the undo information regarding the single transaction may be stored in the persistent storage 140 as the single file 520. In such a case, for example, the name of the file 520 may become "Transaction 40". Therefore, the overhead may be reduced in managing the files stored in the persistent storage 140.

In an additional exemplary embodiment of the present disclosure, when one or more blocks associated with the update request by the transaction need to be disk-flushed, the undo information retained in the space of the memory 160 corresponding to a block that needs to be disk-flushed may be together written to the persistent storage 140. When the database server 120 initiates the transaction, data associated with the operations included in the transaction needs to be loaded onto the memory 160 in the form of the block. After the block is loaded onto the memory 160, operations including update associated with the operations included in the transaction, etc. may be performed in the database server 120. As the operations including the update, etc. are executed, undo information corresponding to the operations may be generated. The undo information may be stored in the memory 160 through the undo memory chunk having the variable size according to an exemplary embodiment of the present disclosure. Therefore, when the block loaded on the memory 160 needs to be disk-flushed (for example, when the block needs to be removed from the memory 160 and moved and written to the persistent storage 140), the corresponding undo information may also be disk-flushed to the persistent storage 140 from the memory 160 together. As a result, since an additional available space of the memory 160 may be secured, the utilization of the storage space may be increased.

According to an exemplary embodiment of the present disclosure, the undo information is principally stored in the memory 160, but may be written to the persistent storage 140 as necessary.

According to an exemplary embodiment of the present disclosure, when the undo information is written to the persistent storage 140, the undo information may be directly written to the persistent storage 140 without passing through the memory 160. For example, based on the available memory size information of the undo memory pool, the database server 120 may determine whether to store the undo information associated with one or more transactions in the memory 160 using the undo memory chunk or whether to store the undo information associated with one or more transactions in the form of the file in the persistent storage 140.

According to an exemplary embodiment of the present disclosure, when the undo information is written to the persistent storage 140, the undo information may be written to the persistent storage 140 after passing through the memory 160. For example, when the block(s) associated with the update request of the transaction needs to be disk-flushed to the persistent storage 140, undo information retained in the space of the memory 160, corresponding to a block that needs to be disk-flushed or undo information of the uncommitted transaction among the transactions corresponding to the block that needs to be disk-flushed may be written to the persistent storage 140. For example, when the block(s) associated with the update request of the transaction needs to be disk-flushed to the persistent storage 140, the uncommitted transaction is configured as the individual file by the unit of the transaction, and as a result, the undo information may be written to the persistent storage 140.

According to an exemplary embodiment of the present disclosure, a plurality of committed transactions may be grouped and configured as one file and transactions which are not committed or are in the Active state may be configured as one file for each transaction.

According to an exemplary embodiment of the present disclosure, files associated with the committed transactions may be stored in a first directory and a file(s) associated with the transactions which are not committed or are in the Active state may be stored in a second directory. Here, the first directory and the second directory may mean different directories. In such a case, in a situation in which the DB system is abnormally terminated, files generated by the Active transaction may be used for recovering the situation, and as a result, performance of DB recovery may be enhanced. Since the directories of the committed transaction and the Active transaction may be distinguished from each other, the DB recovery may be performed through the access to a directory including an undo related file of the Active transaction.

According to an exemplary embodiment of the present disclosure, after determining to transfer the undo information associated with one or more transactions from the memory 160 to the persistent storage 160, the database server 120 may perform at least one scheme of a scheme of transferring to the persistent storage 140 undo information with a smaller number of access times for a predetermined time period preferentially over undo information with a larger number of access times, and a scheme of preferentially transferring to the persistent storage 140 undo information associated with the committed transaction.

Here, the scheme of preferentially transferring the undo information associated with the committed transaction to the persistent storage may include storing in the persistent storage 140 another undo memory chunk other than an undo memory chunk which is being currently used among the undo memory chunks associated with the Active transaction when a ratio occupied by the allocated undo memory chunk in the undo memory pool is higher than the predetermined threshold ratio even after storing the undo information associated with the committed transaction.

In an exemplary embodiment of the present disclosure, when the undo information is stored in the persistent storage 140 in the form of the file, the name of the file stored in the persistent storage may be set as the identifier of the transaction.

In an exemplary embodiment of the present disclosure, after the database server 120 stores the undo information in the persistent storage 140 in the form of the file, the database server 120 is committed by the thread dedicated to managing the undo information and the database server 120 may determine to remove the undo information related to a transaction in which a predetermined undo retaining period has elapsed from the persistent storage 140.

In an exemplary embodiment of the present disclosure, the database server 120 may retain the undo information on the space of the memory 160 by using the determined undo memory chunk and then receive one or more subsequent transactions. The database server 120 may determine to store in the memory 160 header information among the undo information associated with the transaction by using at least a part of the undo memory space and store in the persistent storage 160 remaining information other than the header information in the form of the file among the undo information associated with the transaction based on the available memory size information of the undo memory pool.

Here, the header information may include the transaction ID and a location of the undo information and at least a part of the undo memory space in which the header information is to be stored may be another part other than the undo memory chunk in the memory 160.

In an exemplary embodiment of the present disclosure, when the undo information transferred to the persistent storage 140 on the memory 160 is required, the database server 120 may determine to transfer the undo information transferred to the persistent storage 140 to the memory 160 again by the unit of the transaction or undo memory chunk based on the hash table.

In an exemplary embodiment of the present disclosure, the database server 120 may generate the undo information associated with the committed transaction as one file or each individual file and write the generated file to the persistent storage 140.

FIG. 6 is a block diagram of an exemplary computing device for performing undo information management and processing according to an exemplary embodiment of the present disclosure.

The present disclosure has generally been described above in association with a computer executable command which may be executed on one or more computers, but it will be well appreciated by those skilled in the art that the present disclosure can be implemented through a combination with other program modules and/or as a combination of hardware and software. The aforementioned exemplary computing device may correspond to the database server 120 or a predetermined type of database management device.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Any medium accessible by a computer may be a computer readable medium, and the computer readable medium may include a computer readable storage medium and a computer readable transmission medium.

The computer readable storage medium includes volatile and nonvolatile media and movable and non-movable media. The computer readable storage media include volatile and non-volatile media and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally includes information transfer media that implement the computer readable command, the data structure, the program module, or other data in a carrier wave or a modulated data signal such as other transport mechanism. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104. The computer 1102 may be an example of the database server 120 and/or the user terminal 110 according to the present disclosure.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or recorded in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) or an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps(802.11a) or 54 Mbps (802.11b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is coherent with the principles and new features presented herein.

What is claimed is:

1. A non-transitory computer readable medium including a computer program including encoded commands, which is configured to cause one or more processors to perform a method for managing undo information in a database management system (DBMS) when the computer program is executed by the one or more processors, wherein the method comprises:

determining an undo memory chunk on a memory to be allocated to undo information generated in response to operations, associated with an update request by a first transaction in the database management system (DBMS) being preformed on one or more blocks, wherein the undo memory chunk has a variable size;

determining to maintain the undo information on a space of the memory by using the determined undo memory chunk;

determining to transfer undo information associated with one or more transactions from the memory to a persistent storage by a predetermined condition; and storing meta information of the undo information in a memory space, after the determining to transfer the undo information associated with one or more transactions from the memory to the persistent storage by the predetermined condition, wherein determining the undo memory chunk of the memory to be allocated to the undo information includes determining the size of the undo memory chunk to be allocated to the undo information based at least on information on the number of times the first transaction is allocated an undo memory chunk, and wherein the predetermined condition includes at least one of a case where a ratio between the memory space occupied by the allocated undo memory chunk to the memory space or an absolute amount occupied by the allocated undo memory chunk in the memory is higher than a predetermined threshold value, or a case where the one or more blocks, loaded on the memory in association with the update request by the first transaction, need to be disk-flushed.

2. The non-transitory computer readable medium of claim 1, wherein the determining of the undo memory chunk to be allocated to the undo information includes determining the size of the undo memory chunk to be allocated to the undo information based on information on the number of times the first transaction is allocated an undo memory chunk, and
the size of a first undo memory chunk allocated to the first transaction is smaller than the size of a second undo memory chunk allocated to the first transaction after the first transaction is allocated the first undo memory chunk.

3. The non-transitory computer readable medium of claim 1, wherein the determining of the undo memory chunk to be allocated to the undo information includes determining the size of the undo memory chunk to be allocated to the undo information based on at least one of available memory size information in the memory or task amount information associated with the first transaction, and
wherein the task amount information includes quantitative data for the undo information corresponding to the first transaction or quantitative data for undo information corresponding to each of one or more updates included in the first transaction.

4. The non-transitory computer readable medium of claim 1, wherein a size of a first undo memory chunk allocated to first undo information associated with the first transaction and the size of a second undo memory chunk allocated to second undo information associated with a second transaction different from the first transaction are different.

5. The non-transitory computer readable medium of claim 1, wherein the method further comprises generating a structure configured to use an identifier of the undo memory chunk and the identifier of the first transaction to allow the undo memory chunk to be retrieved.

6. The non-transitory computer readable medium of claim 1, wherein the method further comprises generating a first hash structure configured to use as an input key at least one of an identifier (ID) of the undo memory chunk, an identifier (ID) of the first transaction, or an identifier (ID) for the undo information associated with the first transaction, and use a pointer for the undo memory chunk as an entry of an output.

7. The non-transitory computer readable medium of claim 1, wherein subsequent undo information among a plurality of undo information associated with the first transaction includes a pointer value for pointing an address of an undo memory chunk corresponding to preceding undo information among the plurality of undo information associated with the first transaction.

8. The non-transitory computer readable medium of claim 1, wherein the method further comprises determining whether to return the undo memory chunk used for retaining the undo information to the memory, after the determining to maintain the undo information in the space of the memory by using the determined undo memory chunk.

9. The non-transitory computer readable medium of claim 8, wherein the determining whether to return to the memory includes determining whether to return the undo memory chunk to the memory based on whether a predetermined time period for retaining the undo information has elapsed from the time when the transaction is committed.

10. The non-transitory computer readable medium of claim 8, wherein the determining whether to return to the memory includes
determining whether there are transactions committed before a start point of time of an open cursor of which start time is earliest among open cursors which currently exist, and
determining to return the undo memory chunk used for retaining the undo information associated with the transactions committed before the start time of the open cursor of which start time is earliest among the open cursors which currently exist to the memory, if there are transactions committed before the start time of the open cursor of which start time is earliest among the open cursors which currently exist.

11. The non-transitory computer readable medium of claim 8, wherein the determining whether to return the used undo memory chunk to the memory is performed by a thread dedicated to undo lifetime management,
wherein the thread dedicated to the undo lifetime management retains list information for transactions which are committed, and
wherein the list information includes information on the point of time when the transactions are committed.

12. The non-transitory computer readable medium of claim 1, wherein the method further comprises
after the determining to transfer the undo information associated with the one or more transactions from the memory to the persistent storage according to a predetermined condition that a ratio or an absolute amount occupied by the allocated undo memory chunk in the memory is higher than a predetermined threshold value,
performing at least one scheme of a scheme of transferring to the persistent storage undo information with a smaller number of access times for a predetermined time period preferentially over undo information with a larger number of access times, or a scheme of preferentially transferring the undo information associated with a committed transaction to the persistent storage, and
wherein the scheme of preferentially transferring the undo information associated with the committed transaction to the persistent storage includes storing in the persistent storage another undo memory chunk other than an undo memory chunk being currently used among undo memory chunks associated with an active transaction, if a ratio or an absolute amount occupied by the allocated undo memory chunk in the memory is higher than the predetermined threshold value after storing the undo information associated with the committed transaction.

13. The non-transitory computer readable medium of claim 1, wherein the method further comprises
after the determining to transfer the undo information associated with the one or more transactions from the memory to the persistent storage according to one or more predetermined conditions that one or more blocks associated with the update request by the first transaction need to be disk-flushed among the predetermined conditions,
performing a scheme of transferring to the persistent storage undo information retained in the space of the memory, corresponding to a block that needs to be disk-flushed or undo information of an uncommitted transaction among the transactions, corresponding to the block that needs to be disk-flushed.

14. The non-transitory computer readable medium of claim 1, wherein the method further comprises
determining to store the undo information in the persistent storage by grouping committed transactions and configuring the grouped committed transactions as one file and configuring uncommitted transactions as individual files for each transaction.

15. The non-transitory computer readable medium of claim 1, wherein the method further comprises
after the determining to transfer undo information associated with one or more transactions from the memory to a persistent storage by a predetermined condition,
determining to store a file associated with committed transaction in a first directory of the persistent storage and store a file associated with uncommitted transaction in a second directory of the persistent storage, and
wherein the first directory and the second directory are different.

16. The non-transitory computer readable medium of claim 1, wherein if the undo information is stored in the persistent storage in a form of a file, a file name stored in the persistent storage is set as an identifier of a transaction.

17. The non-transitory computer program stored in a computer readable storage medium of claim 1, wherein the method further comprises
after transferring the undo information to the persistent storage,
determining to remove, from the persistent storage, the undo information associated with a transaction which is committed by a thread dedicated to undo information management and in which a predetermined undo retention period has elapsed.

18. The non-transitory computer readable medium of claim 1, wherein the meta information includes at least one of a transaction identifier (ID) or a location of the undo information in the persistent storage.

19. The non-transitory computer readable medium of claim 1, wherein the method further comprises
determining to transfer a persistent-storage-stored undo information, which was transferred from the memory to the persistent storage, back to the memory by units of the transaction or by units of the undo memory chunk, when the persistent-storage-stored undo information is required.

20. A server for managing undo information in a database management system (DBMS), the server comprising:
a memory; and
one or more processors operable in the memory,
wherein the one or more processors perform:
an operation of determining an undo memory chunk on the memory to be allocated to undo information generated in response to operations, associated with an update request by a first transaction in the database management system (DBMS) being performed on one or more blocks, wherein the undo memory chunk has a variable size,
an operation of determining to maintain the undo information on a space of the memory by using the determined undo memory chunk,
an operation of determining to transfer undo information associated with one or more transactions from the memory to a persistent storage by a predetermined condition, and
an operation of storing meta information of the undo information in a memory space, after the operation of determining to transfer the undo information associated with one or more transactions from the memory to the persistent storage by the predetermined condition,
wherein determining the undo memory chunk on the memory to be allocated to the undo information includes determining the size of the undo memory chunk to be allocated to the undo information based at least on information on the number of times the first transaction is allocated an undo memory chunk, and
wherein the predetermined condition includes at least one of
a case where a ratio between the memory space occupied by the allocated undo memory chunk to the memory space or an absolute amount occupied by the allocated undo memory chunk in the memory is higher than a predetermined threshold value, or
a case where the one or more blocks, loaded on the memory in association with the update request by the first transaction, need to be disk-flushed.

* * * * *